United States Patent
Soundararajan et al.

(10) Patent No.: US 8,484,621 B2
(45) Date of Patent: Jul. 9, 2013

(54) METHOD AND SYSTEM FOR DATA CENTRIC HEAP PROFILING

(75) Inventors: Suresh Soundararajan, Karnataka (IN); Jini Susan George, Karnataka (IN); Sandya Srivilliputtur Mannarswamy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1050 days.

(21) Appl. No.: 12/490,350

(22) Filed: Jun. 24, 2009

(65) Prior Publication Data

US 2010/0287538 A1 Nov. 11, 2010

(30) Foreign Application Priority Data

May 7, 2009 (IN) .......................... 1061/CHE/2009

(51) Int. Cl.
*G06F 9/44* (2006.01)
*G01R 27/28* (2006.01)

(52) U.S. Cl.
USPC .......................................... 717/128; 702/119

(58) Field of Classification Search
None
See application file for complete search history.

(56) References Cited

U.S. PATENT DOCUMENTS

2006/0085156 A1* 4/2006 Kolawa et al. ............... 702/119
2010/0287536 A1* 11/2010 Chung et al. ................. 717/128

* cited by examiner

*Primary Examiner* — Hyun Nam (57) ABSTRACT

A method and system for data centric heap profiling is disclosed. In one embodiment, a method, implemented in a computing device, for data centric heap profiling includes generating a type table for data structure types in source code using a compiler of the computing device. The method also includes identifying each heap allocation site and a corresponding data structure type in the source code using the compiler. The method further includes generating a data centric view of a heap o fan application compiled from the source code based on the each heap allocation site and the corresponding data structure type using a debugger of the computing device when a snapshot of the heap is requested during an execution of the application.

11 Claims, 6 Drawing Sheets

| DATA STRUCTURE TYPE 202 | SIZE 204 (IN BYTES) |
|---|---|
| INT | 4 |
| CHAR | 1 |
| STRUCTURE NODE | 20 |
| ... | ... |

FIG. 2A

| PC VALUE 206 (HEAP ALLOCATION SITE) | ALLOC (A)/DE-ALLOC (D) 208 | POINTERS TO DATA STRUCTURE TYPE(S) 210 |
|---|---|---|
| 1000 | A | 1, 3, ... |
| 1800 | D | |
| 2000 | A | 2, ... |
| ... | ... | ... |
| ... | ... | ... |

FIG. 2B

| ALLOCATED/DE-ALLOCATED ADDRESS 212 | SIZE 214 (IN BYTES) | ALLOC (A)/DE-ALLOC (D) 208 | STACK TRACE PCs 216 |
|---|---|---|---|
| 50000 | 512 | A | 1000 |
| 60000 | 2048 | D | 1800 |
| 70000 | 6000 | A | 2000 |
| ... | ... | ... | ... |

METHOD AND SYSTEM FOR DATA CENTRIC HEAP PROFILING

RELATED APPLICATIONS

Benefit is claimed under 35 U.S.C. 119(a)-(d) to Foreign application Serial No. 1061/CHE/2009 entitled "METHOD AND SYSTEM FOR DATA CENTRIC HEAP PROFILING" by Hewlett-Packard Development Company, L.P., filed on 7 May, 2009, which is herein incorporated in its entirety by reference for all purposes.

BACKGROUND

In certain programming languages, a heap may refer to an area of dynamically allocated computer memory that a program process may use to store data in some variable amount that may not be known until the program starts running. The program process may manage its allocated heap by requesting a block of the heap when needed, and returning or releasing the block when the block is not needed any longer. A memory leak may refer to a situation when the block no longer needed is not properly freed or de-allocated due to one or more causes, such as losing track of pointers to stored data objects.

Currently, compiler and debugger tools for analyzing computer programs during the compile and run-time may be run to determine the memory leak or a growth of the heap associated with each computer program. In the case of compiler and debugger tools for weakly typed programming languages, such as C, C++, etc., code-centric profiling of the heap, which associates a heap allocation site with its corresponding call graph signature, may be generated if a snapshot of the heap is requested.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A method and system for data centric heap profiling is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims. The terms 'computer' and 'computing device' are used interchangeably throughout the document.

Figure 1A:
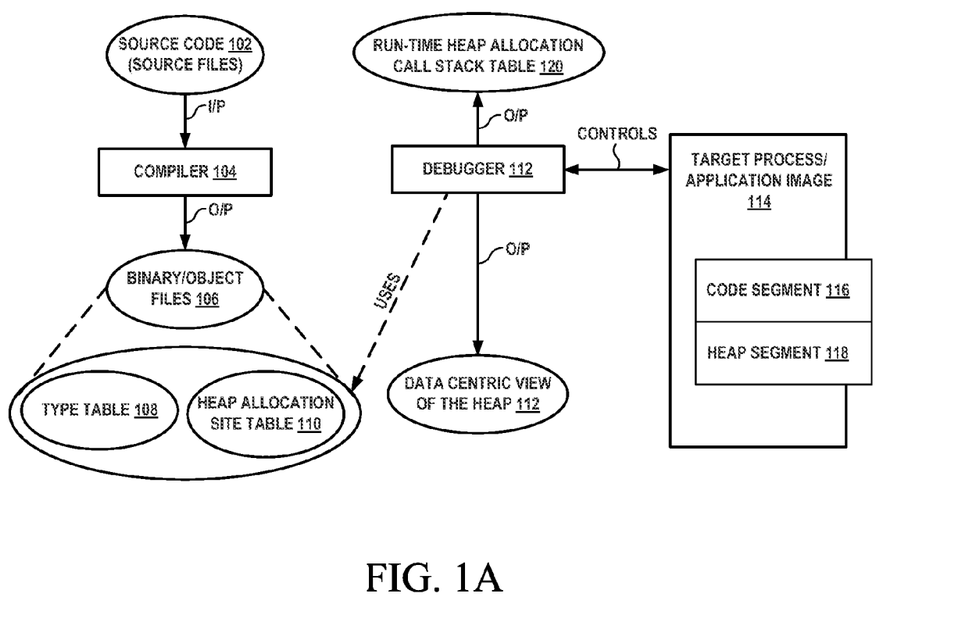
FIG. 1A is a block diagram which illustrates an exemplary process for generating a data centric view of a heap, according to one embodiment.

FIG. 1A is a block diagram which illustrates an exemplary process for generating a data centric view of a heap, according to one embodiment. Particularly, FIG. 1A illustrates a process of data centric heap profiling using a complier 104 and a debugger 112. The compiler 104 may be configured to receive source code 102 and compile the source code 102 to generate binary/object files 106. For example, the source code 102 may be code written using a weakly typed language such as C, C++, Pascal, Scripting language, Python and the like. The compiler 104 may also be configured to generate a type table 108 for data structure types in the source code 102 and a heap allocation site table 110.

Further, the debugger 112 may be configured to control a target process/application image 114, a code segment 116 and a heap segment 118. Furthermore, the debugger 112 may be configured to generate a run-time heap allocation call stack table 120. Moreover, the debugger 112 may be configured to generate a data centric view of the heap 122 using the type table 108, the heap allocation site table 110 and the run-time heap allocation call stack table 120. The data centric view of the heap 122 is a view of the heap in terms of the data structure types in the source code 102 which are present in the heap at the run-time of the source code 102. In one embodiment, the debugger 112 may be configured to generate the data centric view of the heap 122 when a snapshot of the heap is requested during the run-time of the source code 102.

In operation, the compiler 104 may compile a source file(s) associated with the source code 102 to generate the binary/object files 106. The compiler 104 may then generate the type table 108 for the data structure types in the source code 102. The compiler 104 may further identify each heap allocation site and a corresponding data structure type in the source code 102. In one embodiment, the compiler 104 may generate the heap allocation site table 110 based on the each identified heap allocation site and the corresponding data structure type.

Further, the complier 104 may write the type table 108 and the heap allocation site table 110 to a non-loadable section of the binary/object files 106. Then, the debugger 112 may execute the binary/object files 106 with the type table 108 and the heap allocation site table 110. During execution, if a user requests for a snapshot of a heap of an application compiled from the source code 102, the debugger 112 may generate the run-time heap allocation site call stack table 120. Then, using the type table 108, the heap allocation site table 110 in the non-loadable section of the binary/object files 106 and the run-time heap allocation call stack table 120, the debugger 112 may generate the data centric view of the heap 122. Exemplary data centric views of the heap 122, that the debugger 112 may generate, are illustrated and described in greater detail in FIGS. 1B and 1C.

Figure 1B:
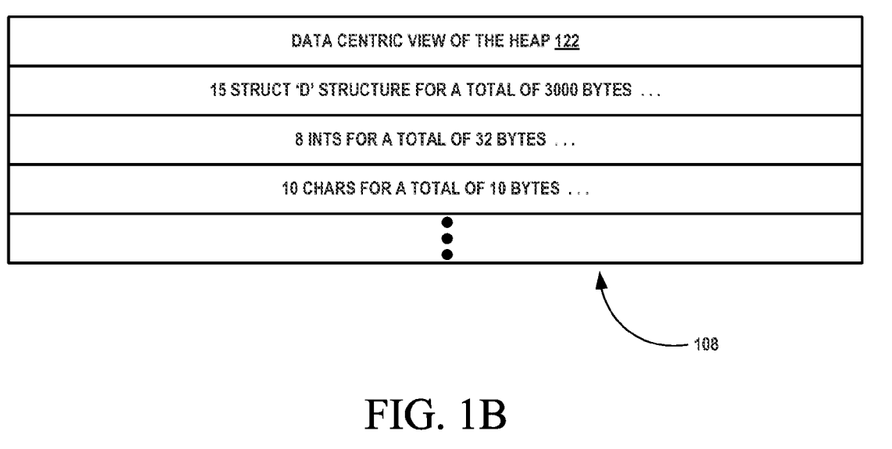
FIG. 1B is an exemplary illustration of the data centric view of the heap in FIG. 1A.

FIG. 1B is an exemplary illustration of the data centric view of the heap 122 in FIG. 1A. As mentioned above, the data centric view of the heap 122 may be generated based on the each heap allocation site and the corresponding data structure type in the source code 102. For example, consider that the source code 102 has total of 33 data structure types which include 15 struct 'd', 8 ints, and 10 chars. Also, the size of 15 struct 'd', 8 ints and 10 chars data structure types for which the heap is allocated is 3000 bytes, 32 bytes and 10 bytes, respectively. In the example embodiment illustrated in FIG. 1B, the data centric view of the heap 122 generated by the debugger 112 using the above-mentioned data structure types and their sizes is displayed as "15 struct 'd' structures for a total of 3000 bytes", "8 ints for a total of 32 bytes" and "10 chars for a total of 10 bytes".

Figure 1C:
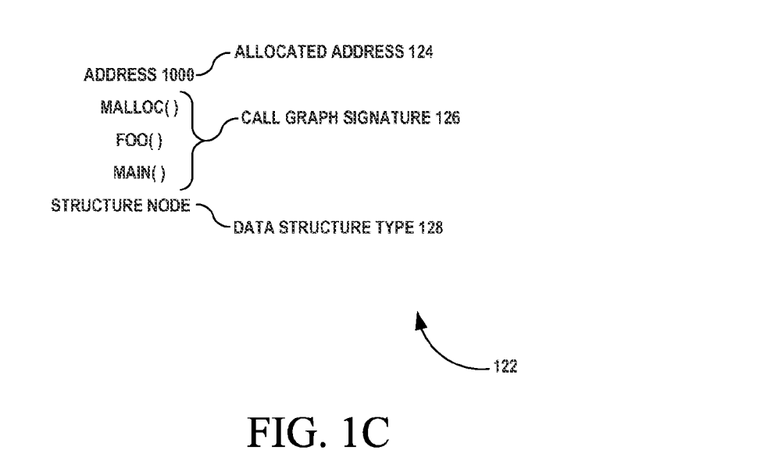
FIG. 1C is another exemplary illustration of the data centric view of the heap in FIG. 1A.

FIG. 1C is another exemplary illustration of the data centric view of the heap 122 in FIG. 1A. As illustrated in FIG. 1C, the data centric view of the heap 122 generated by the debugger 112 includes an allocated address 124, a call graph signature 126 and a data structure type 128. The allocated address 124 may be an address allocated for the heap allocation site. The call graph signature 126 may be a set of functions along a code path from the heap allocation site to a main function. In one embodiment, the debugger 112 may generate the data centric view of the heap 122 by mapping the call graph signature 126 at the point of the each heap allocation site to the corresponding data structure type 128.

For example, consider the following source code 102 for which the debugger 112 may generate a data centric view of the heap 122:

```
Main( )
{
    Foo( );
}
Foo( )
{
    Structure node*p = malloc(sizeof(structure node));
    ............
}
```

Also, consider that 'p' is allocated an address 1000. Thus, the data centric view of the heap 122 generated by the debugger 112 for the above source code 102 is as follows:

```
                    Address 1000
                    Malloc( )
                    Foo( )
                    Main( )
                    Structure node
``` where, in the above data centric view of the heap 122, 'Address 1000' is the allocated address 124, 'Malloc( )', 'Foo( )', 'Main( )' is the call graph signature 126 and 'Structure node' is the data structure type 128. It can be seen from FIG. 1C that, the data centric view of the heap 122 is generated based on mapping the call graph signature 'Malloc( ), Foo( ), Main( )' at 'Address 1000' allocated for the heap allocation site to the corresponding data structure type 'Structure node'.

Figure 2A:
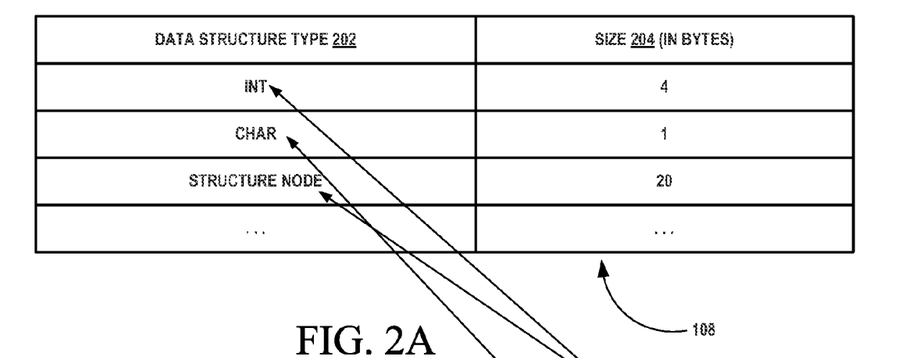
FIG. 2A illustrates an exemplary type table in FIG. 1A.

FIG. 2A illustrates an exemplary type table 108 in FIG. 1A. The type table 108 as illustrated in FIG. 2A includes a data structure type column 202 and a size column 204. The data structure type column 202 may include data structure types in the source code 102. The size column 204 may include a size of corresponding data structure type in the data structure type column 202. In the example embodiment illustrated in FIG. 2A, the data structure type column 202 shows the data structure types in the source code 102 as 'int', 'char' and 'structure node'. Further, the size column 204 shows the size of the data structure types 'int', 'char' and 'structure node' as '4', '1', and '20' bytes respectively.

Figure 2B:
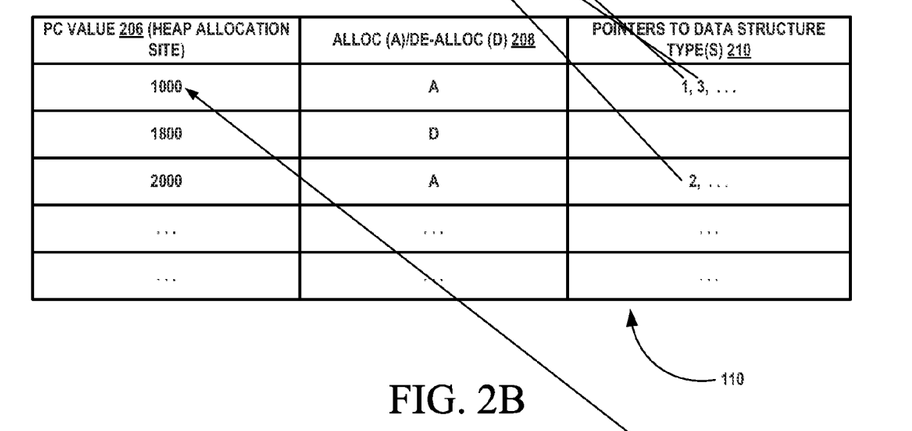
FIG. 2B illustrates an exemplary heap allocation site table in FIG. 1A.

FIG. 2B illustrates an exemplary heap allocation site table 110 in FIG. 1A. As illustrated in FIG. 2B, the heap allocation site table 110 includes a PC value or heap allocation site column 206, an alloc(A)/de-alloc(D) column 208 and a pointer to data structure type(s) column 210.

The PC value column 206 may include a PC value indicating a static code address associated with the data structure type(s) in the source code 102. The alloc(A)/de-alloc(D) column 208 may include an allocation/de-allocation flag for the data structure type(s) corresponding to the PC value. The pointers to data structure type(s) column 210 may include a pointer(s) which points to the data structure type(s) in the data structure type column 202 of the type table 108. In one embodiment, the compiler 104 may use the pointers in the pointers to data structure type(s) column 210 to generate a mapping between the each heap allocation site and the corresponding data structure type.

In one exemplary implementation, the compiler 104 may generate the heap allocation site table 110 upon identifying each heap allocation site and a corresponding data structure type associated with the heap used for processing the source code 102. In one embodiment, the each heap allocation site and the corresponding data structure type associated with the heap may be identified based on an intra-procedural analysis if the corresponding data structure type returned at the each heap allocation site is a correct data structure type.

In an alternate embodiment, each heap allocation site and the corresponding data structure type associated with the heap may be identified based on an inter-procedural analysis if a pointer to void* is returned at each heap allocation site and the pointer is cast to a correct data structure type up in the call graph chain. In one example embodiment, the correct data structure type may be assigned to the returned pointer in an immediate caller of an allocating function associated with the each heap allocation site. In another example embodiment, the correct data structure type may be assigned to the returned pointer from the allocation site in a caller in a call graph signature beyond the immediate caller of the allocating function associated with the each heap allocation site. It is appreciated that, the intra-procedural analysis and the inter-procedural analysis are well known to a person skilled in the art.

In the example embodiment illustrated in FIG. 2B, the PC value column 206 shows the PC values as '1000', '1800' and '2000'. The alloc(A)/de-alloc(D) column 208 shows the allocation/de-allocation flags as 'A', 'D' and 'A' which indicates that the PC values '1000' and '2000' are allocated to the data structure types while the PC value '1800' is de-allocated. The pointers to data structure type(s) column 210 shows the pointers as '3' and '1' in the first row, and '2' in the third row, which indicates that the data structure types 'int' and 'structure node' are mapped to the PC value '1000' and the data structure type 'char' is mapped to the PC value '2000'.

Figure 2C:
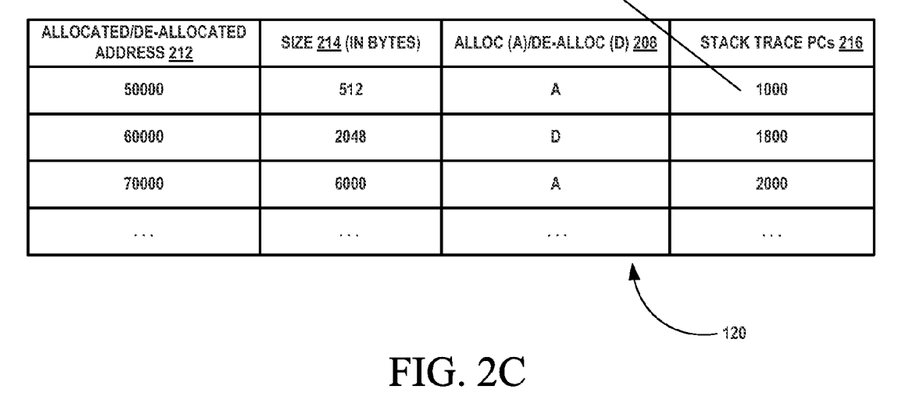
FIG. 2C illustrates an exemplary run-time heap allocation call stack table in FIG. 1A.

FIG. 2C illustrates an exemplary run-time heap allocation call stack table 120 in FIG. 1A. The run-time heap allocation call stack table 120 may include an allocated/de-allocated address column 212, a size column 214, the alloc(A)/de-alloc (D) column 208 and a stack trace PCs column 216. The allocated/de-allocated address column 212 may include an allocated/de-allocated address for the each heap allocation site. The size column 214 may include a size of the allocated/de-allocated address for the each heap allocation site. The stack trace PCs column 216 may include the PC value associated with the data structure types in the source code 102.

In the example embodiment illustrated in FIG. 2C, the allocated/de-allocated address column 212 shows the allocated/de-allocated address for the each heap allocation site as '50000', '60000' and '70000'. The size column 214 shows the size of the addresses '50000', '60000' and '70000' as '512', '2048' and '6000' bytes respectively. The alloc(A)/de-alloc(D) column 208 displays the allocation/de-allocation flags as 'A', 'D' and 'A' which indicates that the addresses '50000' and '70000' are allocated to the data structure types while the address '60000' is de-allocated.

In accordance with the above-described embodiments, the debugger 112 may generate the data centric view of the heap 122 based on the each heap allocation site and the corresponding data structure type. As illustrated, the PC values corresponding to the allocated/de-allocated addresses in the stack trace PCs column 216 of the run-time heap allocation call stack table 120 points back to the respective PC values in the PC value column 206 in the heap allocation site table 110. Further, the pointer(s) for the data structure type(s) in the pointer for data structure type column 210 corresponding to the respective PC value is located in the heap allocation site table 110. Since there exist a mapping between the PC value and corresponding data structure type, the located pointer for the corresponding data structure type(s) may facilitate to find out the corresponding data structure type of the heap based on the PC value. Moreover, the data structure type found may be used to generate the data centric view of the heap 122 as illustrated in FIG. 1C.

Figure 3:
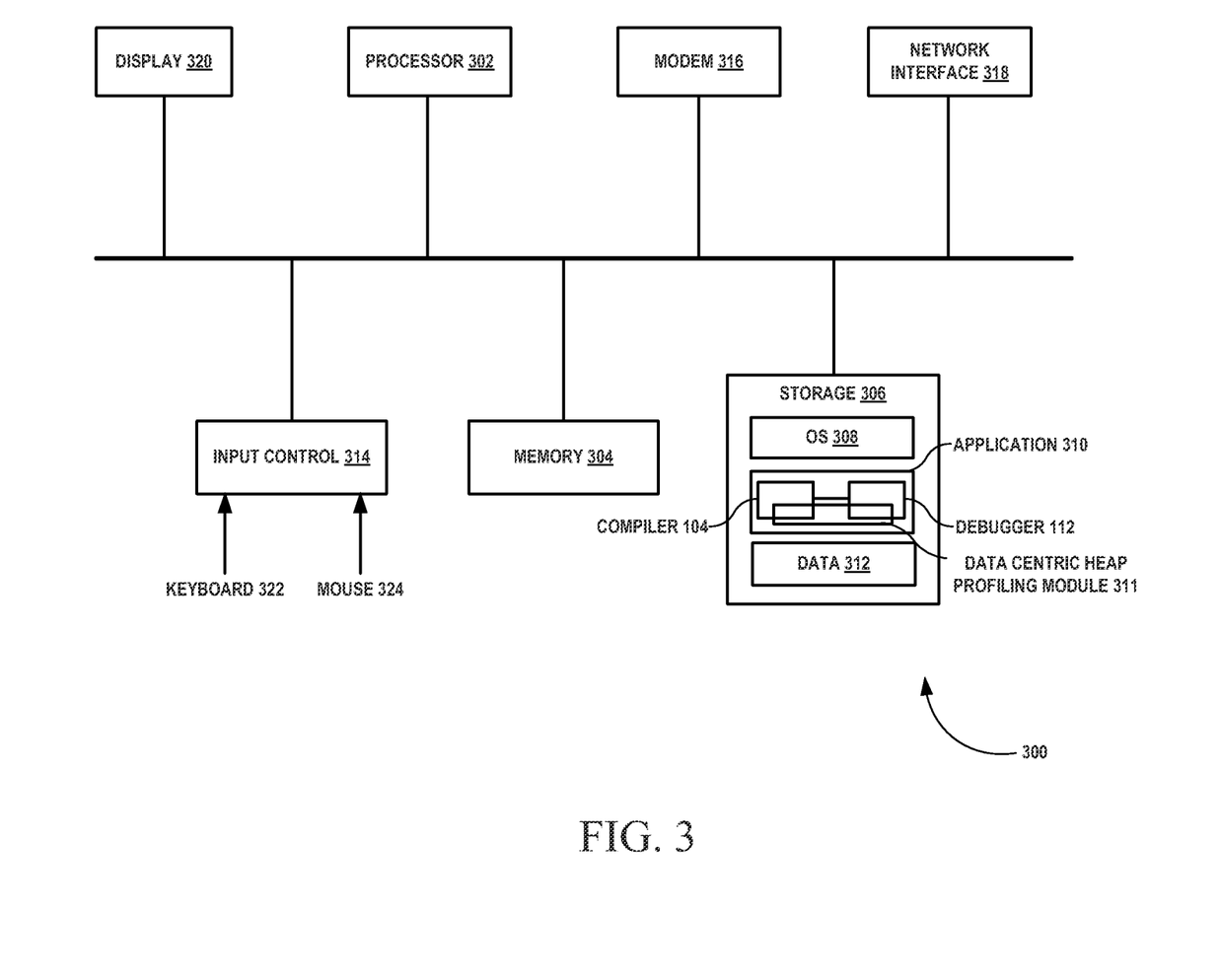
FIG. 3 illustrates an exemplary computing device operable for practicing various embodiments of the present invention.

FIG. 3 illustrates an exemplary computing device 300 operable for practicing various embodiments of the present invention. One of ordinary skill in the art will appreciate that the computing device 300 is intended to be illustrative and not limiting of the present invention. The computing device 300 may take many forms, including but not limited to a workstation, server, network computer, quantum computer, optical computer, bio-computer, Internet appliance, mobile device, pager, tablet computer, and the like.

The computing device 300 may be an electronic device and includes a processor 302, a memory 304, a storage 306, an input control 314, a modem 316, a network interface 318 and a display 320. The processor 302 may be configured for controlling each component of the computing device 300 for generating the data centric view of the heap 122. The memory 304 may be configured for temporarily storing instructions and data. Further, the memory 304 may be configured for providing the stored instructions and data to the processor 302 so that the processor 302 operates the computing device 300 to generate the data centric view of the heap 122 based on a data centric heap profiling module 311 featured in the compiler 104 and the debugger 112 of the application 310.

The storage 306 may include software tools needed for an application 310. The storage 306 includes, in particular, code for an operating system (OS) 308 of the computing device 300, code for the application 310 running on the OS 308 including applications for generating the data centric view of the heap 122, for example, the data centric heap profiling module 311, and data 312 for the data centric view of the heap 122.

The input control 314 may interface with a keyboard 322, a mouse 324, and other input devices. The computing device 300 may receive, through the input control 314, input data for generating the data centric view of the heap 122. The computing device 300 may display user interfaces in the display 320 for users to generate and use the data centric view of the heap 122.

In one embodiment, a system for generating the data centric view of the heap 122 may include the processor 302, and the memory 304 configured for temporarily storing a set of instructions for the data centric heap profiling module 311. The set of instructions, when executed by the processor 302, may cause the processor 302 to perform a method including generating a type table for data structure types in source code 102 using the compiler 104 of the computing device 300.

The method may also include identifying each heap allocation site and a corresponding data structure type in the source code 102 using the compiler 104. The method may further include generating a data centric view of the heap 122 compiled from the source code 102 based on the each heap allocation site and the corresponding data structure type using a debugger of the computing device 300. In one embodiment, the debugger 112 may generate the data centric view of the heap 122 when a snapshot of the heap is requested during an execution of the application.

Figure 4:
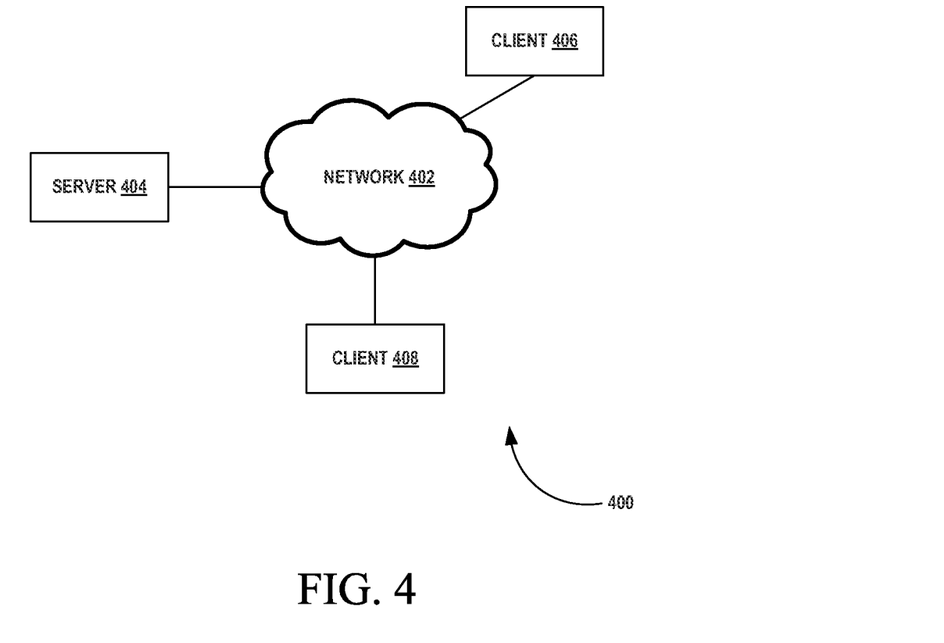
FIG. 4 illustrates an exemplary network environment operable for practicing various embodiments of the present invention.

FIG. 4 illustrates an exemplary network environment 400 operable for practicing various embodiments of the present invention. The network environment 400 may include a server 404 coupled to clients 406 and 408 via a network 402, for example, a communication network. The server 404 and the clients 406 and 408 may be implemented using the computing device 300 depicted in FIG. 3.

The network interface 318 and the modem 316 of the computing device 300 may enable the server 404 to communicate with the clients 406 and 408 through the network 402. The network 402 may include Internet, intranet, local area network, wide area network, metropolitan area network, and the like. The communication facilities may support the distributed implementations of the present invention.

In the network environment 400, the server 404 may provide the clients 406 and 408 with software components or products under a particular condition, such as a license agreement. The software components or products may include those for generating the data centric view of the heap 122. The server 404 may send the clients 406 and 408 the software components or products under a specific license agreement.

Figure 5:
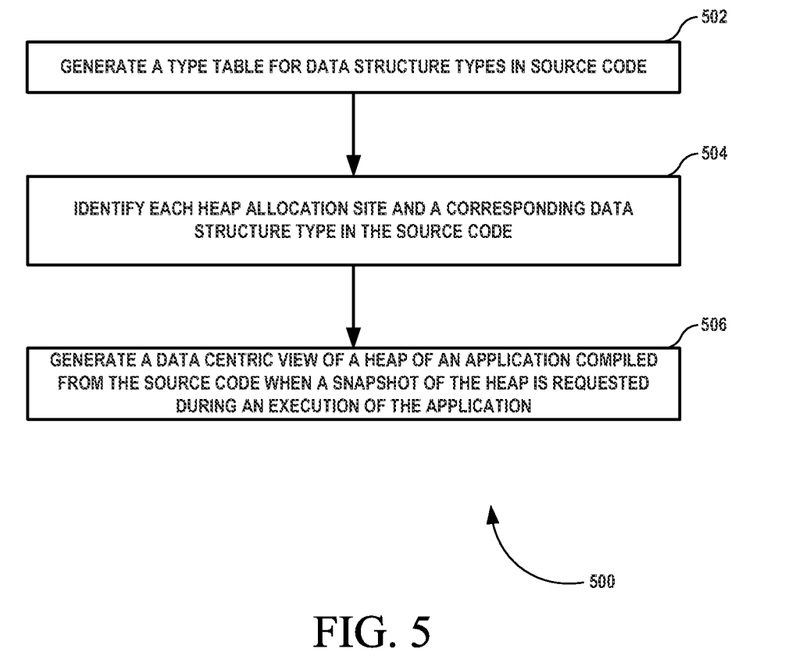
FIG. 5 illustrates a process flow chart for data centric heap profiling, according to one embodiment.

FIG. 5 illustrates a process flow chart 500 for data centric heap profiling, according to one embodiment. In step 502, a type table for data structure types in source code is generated using a compiler of a computing device. In one embodiment, the source code may be written using a weakly typed language which includes C, C++, Pascal, Scripting language, and Python. The type table may include a data structure type and a size of the data structure type.

In step 504, each heap allocation site and a corresponding data structure type is identified in the source code using the compiler. The identifying the each heap allocation site and the corresponding data structure type may include generating a heap allocation site table. The heap allocation site table may include a PC value, an allocation/de-allocation flag, and at least one pointer to at least one of the data structure types. Further, the identifying the each heap allocation site and the corresponding data structure type may include generating a mapping between the each heap allocation site and the corresponding data structure type using at least one pointer.

In one embodiment, the each heap allocation site and the corresponding data structure type may be identified based on an intra-procedural analysis if the corresponding data structure type returned at the each heap allocation site is a correct data structure type. In another embodiment, the each heap allocation site and the corresponding data structure type may be identified based on an inter-procedural analysis if a pointer to void* is returned at the each heap allocation site, and the pointer is cast to a correct data structure type. The correct data structure type may be in an immediate caller of an allocating function associated with the each heap allocation site. Alternatively, the correct data structure type may be in a caller in a call graph signature beyond the immediate caller of the allocating function associated with the each heap allocation site.

In step 506, a data centric view of a heap of an application compiled from the source code is generated based on the each heap allocation site and the corresponding data structure type using a debugger of the computing device when a snapshot of the heap is requested during an execution of the application. In one embodiment, the generating the data centric view of the heap may include generating a run-time heap allocation call stack table. The run-time heap allocation call stack table may include an address allocated for the each heap allocation site, a size of the address, the allocation/de-allocation flag, and the PC value.

In addition, the generating the data centric view of the heap may include mapping a call graph signature at the point of the each heap allocation site to the corresponding data structure type. The call graph signature may be a set of functions along a code path from the each heap allocation site to a main function. Further, the type table and the heap allocation site table may be written to a non-loadable section of binary/object files generated by the compiler. Moreover, in one example embodiment, a computer readable medium for the data centric heap profiling has instructions that, when executed by a computer, cause the computer to perform the method illustrated in FIG. 5.

In various embodiments, the systems and methods described in FIGS. 1 through 5 may provide a technique to map contents of the heap to actual data structure types used by a programmer in a weakly typed language such as C, C++, Pascal, Scripting language, Python, and the like. Further, a compile time type may be associated with a run-time allocated memory block. Furthermore, a data centric view of a heap along with a code centric view may be provided to the programmer for debugging memory issues like excessive heap allocation, or leaks. This may help in better program understanding and debuggability. In addition, the code centric and data centric view of the heap may be provided in terms of call graph paths and data structure types.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method, implemented in a computing device, for data centric heap profiling, comprising:
    generating a type table for data structure types in source code using a compiler of the computing device;
    identifying each heap allocation site and a corresponding data structure type in the source code using the compiler, wherein the identifying the each heap allocation site and the corresponding data structure type comprises:
        generating a heap allocation site table which includes a program counter (PC) value, an allocation/de-allocation flag, and at least one pointer to at least one of the data structure types; and
        generating a mapping between the each heap allocation site and the corresponding data structure type using the at least one pointer;
        wherein the type table and the heap allocation site table are written to a non-loadable section of binary/object files generated by the compiler; and
    generating a data centric view of a heap of an application compiled from the source code based on the each heap allocation site and the corresponding data structure type using a debugger of the computing device when a snapshot of the heap is requested during an execution of the application.

2. The method of claim 1, wherein the type table comprises a data structure type and a size of the data structure type.

3. The method of claim 1, wherein the generating the data centric view of the heap comprises generating a run-time heap allocation call stack table which includes an address allocated for the each heap allocation site, a size of the address, the allocation/de-allocation flag, and the PC value.

4. The method of claim 1, wherein the generating the data centric view of the heap further comprises mapping a call graph signature at the point of the each heap allocation site to the corresponding data structure type, wherein the call graph signature comprises a set of functions along a code path from the each heap allocation site to a main function.

5. The method of claim 1, wherein the identifying the each heap allocation site and the corresponding data structure type is based on an intra-procedural analysis.

6. The method of claim 1, wherein the identifying the each heap allocation site and the corresponding data structure type is based on an inter-procedural analysis, further comprising casting a pointer to void* as a pointer to a correct data structure type.

7. The method of claim 1, wherein the source code is written using a weakly typed language which includes C, C++, Pascal, Scripting language, and Python.

8. A system for data centric heap profiling, comprising:
    a processor; and
    a memory configured for temporarily storing a set of instructions for a data
    centric heap profiling module, when executed by the processor, causes the
    processor to perform a method comprising:
        generating a type table for data structure types in source code using a compiler of a computing device;
        identifying each heap allocation site and a corresponding data structure type in the source code using the compiler, wherein the identifying the each heap allocation site and the corresponding data structure type comprises:
            generating a heap allocation site table which includes a program counter (PC) value, an allocation/de-allocation flag, and at least one pointer to at least one of the data structure types; and
            generating a mapping between the each heap allocation site and the corresponding data structure type using the at least one pointer;
            wherein the type table and the heap allocation site table are written to a non-loadable section of binary/object files generated by the compiler; and
        generating a data centric view of a heap of an application compiled from the source code based on the each heap allocation site and the corresponding data structure type using a debugger of the computing device when a snapshot of the heap is requested during an execution of the application.

9. The system of claim 8, wherein the source code is written using a weakly typed language which includes C, C++, Pascal, Scripting language, and Python.

10. A non-transitory computer readable medium for a data centric heap profiling having instructions that, when executed by a computer, cause the computer to perform a method comprising:

generating a type table for data structure types in source code using a compiler of the computer;

identifying each heap allocation site and a corresponding data structure type in the source code using the compiler, wherein the identifying the each heap allocation site and the corresponding data structure type comprises:

generating a heap allocation site table which includes a program counter (PC) value, an allocation/de-allocation flag, and at least one pointer to at least one of the data structure types; and generating a mapping between the each heap allocation site and the corresponding data structure type using the at least one pointer;

wherein the type table and the heap allocation site table are written to a non-loadable section of binary/object files generated by the compiler; and generating a data centric view of a heap of an application compiled from the source code based on the each heap allocation site and the corresponding data structure type using a debugger of the computer when a snapshot of the heap is requested during an execution of the application.

11. The non-transitory computer readable medium of claim 10, wherein the identifying the each heap allocation site and the corresponding data structure type comprises:

generating a heap allocation site table which includes a PC value, an allocation/de-allocation flag, and at least one pointer to at least one of the data structure types; and generating a mapping between the each heap allocation site and the corresponding data structure type using the at least one pointer.

* * * * *